(12) United States Patent
Brown et al.

(10) Patent No.: US 6,599,332 B2
(45) Date of Patent: Jul. 29, 2003

(54) PROCESS FOR THE PRODUCTION OF ALUMINUM HYDROXIDE

(75) Inventors: Neil Brown, Bergheim (DE); Norbert Putz, Bergheim (DE)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 10/169,557

(22) PCT Filed: Jan. 10, 2001

(86) PCT No.: PCT/EP01/00182

§ 371 (c)(1),
(2), (4) Date: Sep. 19, 2002

(87) PCT Pub. No.: WO01/51419

PCT Pub. Date: Jul. 19, 2001

(65) Prior Publication Data

US 2003/0049198 A1 Mar. 13, 2003

(30) Foreign Application Priority Data

Jan. 10, 2000 (EP) .............................................. 00100429

(51) Int. Cl.⁷ .................................................. C01F 7/02
(52) U.S. Cl. ...................................... 23/305 A; 423/629
(58) Field of Search ......................... 23/305 A; 423/600, 423/625, 629

(56) References Cited

U.S. PATENT DOCUMENTS

| 5,302,368 A | 4/1994 | Harato et al. |
| 5,378,753 A | 1/1995 | Brown |
| 6,130,283 A | 10/2000 | Nippa et al. |

FOREIGN PATENT DOCUMENTS

| EP | 0 143 576 A1 | 6/1985 |
| JP | 62 083316 A | 4/1987 |

*Primary Examiner*—Stanley S. Silverman
*Assistant Examiner*—Edward M. Johnson
(74) *Attorney, Agent, or Firm*—Jeffrey S. Melcher; Manelli Denison & Selter, PLLC

(57) ABSTRACT

Aluminium hydroxide of improved thermal stability is produced by spray-drying of an aqueous slurry of aluminium hydroxide at 400 to 600° C. drying gas temperature. The resulting aluminium hydroxide is suitable as a flame retardant filler in polymeric systems with high processing temperatures. It has a low specific surface area and good rheological properties.

6 Claims, No Drawings

PROCESS FOR THE PRODUCTION OF ALUMINUM HYDROXIDE

The invention relates to a process for the production of an aluminium hydroxide of improved thermal stability which can be incorporated in plastic composite materials whose processing temperatures exceed 200° C.

Aluminium hydroxide ($Al(OH)_3$) is widely used as a flame retardant in polymeric systems. On heating to above a temperature of ca. 200° C., the aluminium hydroxide begins to decompose to aluminium oxide and water. This reaction is endothermic, thus absorbing heat from the of the polymer. The amount of water released corresponds to 34.6 wt. % of the aluminium hydroxide. Both these factors act to suppress a burning process and reduce the formation of combustible gases by keeping the temperature down.

To be useful as a flame retardant, the aluminium hydroxide must remain stable during processing of the polymer. This renders it unsuitable for polymers which are processed above 200° C.

Prior art indicates that one way around this limitation is to preheat the aluminium hydroxide to eliminate a part of the water which is released at elevated temperatures. However, there are inherent disadvantages in this approach:

The amount of water (vapour) available for the flame retardant action is reduced.

A portion of the aluminium (tri)hydroxide on heating above 200° C. converts to aluminium oxide hydroxide (AlOOH, "alumina monohydrate") which contains only one third of the amount of water and which is thermally stable until ca. 520° C., i.e., until a temperature well above the useful range for effective flame retardancy of plastic materials.

Partial elimination of water as a means of stabilizing against subsequent early release of water vapour at elevated temperatures is accompanied by an increase in specifc surface area of the aluminium hydroxide. This increased surface is in the form of fine porosity which imparts hygroscopic properties to the surface of the thermally stabilized crystals. Increased specific surface area is further accompanied by higher oil absorption and higher viscosity in synthetic resins.

The problem to be solved by the present invention was to provide a simple and economic process for the production of aluminium hydroxides of improved thermal stability, high water content and low specific surface area.

According to the invention, this problem has been solved by the process of claim 1.

It has been found that aluminium trihydroxide can be partially dehydrated at elevated temperatures without a concomitant increase in the specific surface area and with little or no creation of aluminium oxide hydroxide, provided that the residence time at the dehydration temperature is sufficiently short. According to the present invention, this is accomplished by spray drying of an aqueous slurry of ordinary aluminium hydroxide at a drying gas temperature (at the inlet) of 400 to 600° C.

Preferably, the drying gas temperature is 450 to 550° C.

The exit gas temperature from the spray-dryer is preferably 200 to 300° C.

The residence time of the aluminium hydroxide in the spray-dryer is preferably 0.5 to 10 s, more preferably 1 to 5 s.

Preferably, the average particle size of the starting aluminium hydroxide is 2 $\mu$m or less. Advantageously, coarse particles (e.g. >10 $\mu$m) are removed before spray drying. The aluminium hydroxide slurry used as starting material may be produced by crystallization from the sodium aluminate liquor of the Bayer process, filtering and thoroughly washing with hot water, and re-slurrying in an amount of water sufficient to obtain a slurry suitable for feeding to a spray-dryer. Typically, the solids content of the slurry is 40 to 60 wt. %.

The process of the present invention achieves the goal of improved thermal stability with no significant increase in the specific surface area of the aluminium hydroxide, as compared to the starting material, and without substantial decrease of the loss on ignition (LOI) values. Moreover, X-ray diffraction diagrams reveal the formation of trace quantities of aluminium oxide hydroxide (boehmite, AlOOH) only, hence indicating a maximum retention of the effective fire retardant aluminium trihydroxide.

The product of the present invention is of industrial importance especially in the application area of environment friendly printed circuit boards, where aluminium hydroxide can now be used to achieve the UL-94 V0 fire rating without the problems associated with the hygroscopic nature of the aluminium trihydroxide of the prior art, without raised viscosity levels and reduction in fire retardant effectiveness due to the presence of boehmite.

The following non-limiting examples illustrate the process of the present invention. The starting material in each example was aluminium hydroxide from different batches of the type Martinal® OL-104 (manufacturer: Alusuisse Martinswerk GmbH, Bergheim, Germany).

COMPARATIVE EXAMPLE 1

Samples of aluminium hydroxide Martinal® OL-104 (Alusuisse Martinswerk GmbH, Bergheim, Germany) having a specific surface area of 3.75 $m^2/g$ were heated in an oven at various temperatures for different periods of time. The sample size was 100 g in each case. After the thermal treatment, the loss-on-ignition (LOI) and the specific surface area of each sample were measured and X-ray diffraction diagrams were recorded. The results obtained are given in Table 1.

TABLE 1

| Temperature [° C.] | Time [h] | LOI [wt. %] | Specific Surface [$m^2/g$] |
|---|---|---|---|
| 180 | 1 | 34.4 | 3.85 |
| 180 | 2 | 34.1 | 3.92 |
| 180 | 4 | 33.6 | 4.10 |
| 200 | 1 | 33.5 | 4.47 |
| 200 | 2 | 33.1 | 5.30 |
| 220 | 1 | 32.7 | 6.76 |
| 220 | 2 | 30.7 | 34.2 |

The data indicate that the low temperature—extended time combination leads to increased specific surface area as loss-on-ignition decreases.

In all cases, some aluminium oxide hydroxide was formed as evidenced from X-ray diffraction.

COMPARATIVE EXAMPLE 2

Untreated Martinal® OL-104 and the aluminium hydroxide obtained in Example 1 by the 200° C./1 h treatment were dispersed in unsaturated polyester resin Synolite® 0020-N-2 (DSM BASF Structural Resins) using a filling level of 150 phr (parts per hundred resin). Comparative viscosity measurements were made at 23° C. using a Brookfield HBT viscosimeter with Spindle 3 at 10 rpm. The results are given in Table 2.

TABLE 2

| Aluminium Hydroxide | Viscosity [Pa · s] |
| --- | --- |
| Martinal ® OL-104 (untreated) | 150 |
| Martinal ® OL-104 (200° C./1 h) | 176 |

The results show that the heat treatment increased the viscosity of the resin/aluminium hydroxide mix by almost 20%.

EXAMPLE 1

Approx. 5 kg of an aqueous slurry of Martinal® OL-104 (53 wt. % solids) were spray-dried in an Niro (Niro A/S, Soeberg, Denmark) spray-dryer (type "Production Minor") at a slurry feed rate of ca. 5 kg/h and an air flow of 300 kg/h. The inlet gas temperature was 480° C. and the exit temperature ca. 200° C. with a solids retention time of ca. 3 seconds. Approximately 2.5 kg of product were recovered from the dryer. The product had a specific surface area of 4.3 $m^2/g$ and loss on ignition of 33.2 wt. % (starting material: 4.5 $m^2/g$ and 34.6 wt. %, respectively), i.e., the specific surface area was within the experimental error of the method unchanged.

The rheological properties of the product were determined as described in Comparative Example 2. The results are given in Table 3.

TABLE 3

| Aluminium Hydroxide | Viscosity [Pa · s] |
| --- | --- |
| Martinal ® OL-104 (untreated) | 165 |
| Martinal ® OL-104 (treated) | 160 |

The results show that the spray drying had no significant effect on the rheological properties of the product.

EXAMPLE 2

Essentially the same procedure was adopted as in Example 1 except that the production was scaled up to the industrial level. This time a Niro dryer (type SD-0080-CN/CR) with a throughput of 150 to 450 kg per hour was used with an air flow of ca. 1000 kg/h. The starting material Martinal® OL-104 (specific surface area 4.6 $m^2/g$) was slurried in water to give ca. 50 wt. % solids. The inlet temperature of the air to the dryer could be varied between 400 and 580° C. The exit temperature varied between 200 and 300° C. Total retention time in the reactor was 2–10 s. The dried product was bagged in plastic-lined paper bags.

The characteristics of the product were as follows:

| | |
| --- | --- |
| Loss on Ignition (wt. %) | 32.5 |
| Specific Surface Area ($m^2/g$) | 4.8 |
| Oil Absorption (ml/100 g) | 28 |
| Viscosity in Synthetic Resin (Pa · s) | 160 |

What is claimed is:

1. A process for the production of aluminium hydroxide of improved thermal stability, comprising spray-drying of an aqueous slurry of aluminium hydroxide at a drying gas temperature of 400 to 600° C.

2. The process of claim 1, wherein the drying gas temperature is 450 to 550° C.

3. The process of claim 1, wherein the exit gas temperature from the spray-dryer is 200 to 300° C.

4. The process of claim 1, wherein the residence time in the spray-dryer is 0.5 to 10 seconds.

5. The process of claim 1, wherein the average particle size of the starting aluminum hydroxide is 2 $\mu$m or less.

6. The process of claim 1, wherein the residence time in the spray-dryer is 1 to 5 seconds.

* * * * *